(12) United States Patent
Boehm

(10) Patent No.: US 11,078,815 B2
(45) Date of Patent: Aug. 3, 2021

(54) CONVEYING DEVICE FOR CONVEYING OIL

(71) Applicant: Continental Automotive GmbH, Hannover (DE)

(72) Inventor: Christian Boehm, Frankfurt am Main (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 15/971,175

(22) Filed: May 4, 2018

(65) Prior Publication Data

US 2018/0252126 A1 Sep. 6, 2018

Related U.S. Application Data

(63) Continuation of application No. PCT/EP2016/076563, filed on Nov. 3, 2016.

(30) Foreign Application Priority Data

Nov. 6, 2015 (DE) ..................... 10 2015 221 891.0

(51) Int. Cl.
*F01M 1/02* (2006.01)
*F01M 1/12* (2006.01)
*F16H 57/04* (2010.01)

(52) U.S. Cl.
CPC .............. *F01M 1/02* (2013.01); *F01M 1/12* (2013.01); *F16H 57/0439* (2013.01); *F01M 2001/0215* (2013.01); *F01M 2001/0238* (2013.01); *F01M 2001/0253* (2013.01); *F01M 2001/123* (2013.01)

(58) Field of Classification Search
CPC ...... F01M 1/02; F01M 1/12; F01M 2001/123; F01M 2001/0238; F01M 2001/0215; F01M 2001/0253; F16H 57/0439; F04C 11/00; F04C 15/00; F04C 2/00; F04C 2/344;
(Continued)

(56) References Cited

U.S. PATENT DOCUMENTS 4,703,726 A 11/1987 Sekiya et al.
6,874,996 B2 4/2005 Iwanami
(Continued)

FOREIGN PATENT DOCUMENTS

DE 3002391 A1 8/1981
DE 102004005430 A1 8/2005
(Continued)

OTHER PUBLICATIONS

International Search Report and Written Opinion dated Feb. 13, 2017 from corresponding International Patent Application No. PCT/EP2016/076563.
(Continued)

*Primary Examiner* — Grant Moubry

(57) ABSTRACT

A delivery device for delivering oil from an oil sump in a motor vehicle has an oil pump with two pressure stages. The pressure stages deliver oil from a common suction connection to different outlet connections. The oil is delivered by the pressure stages at different delivery pressures and in different delivery volumes. The delivery device furthermore has a direct drive, which is coupled to an internal combustion engine, and an activatable electric drive.

10 Claims, 3 Drawing Sheets

(58) Field of Classification Search
CPC .. F04C 2/3446; F04C 15/008; F04C 29/0085; F04C 2240/45; F04C 2240/40
See application file for complete search history.

(56) References Cited

U.S. PATENT DOCUMENTS

| | | | |
|---|---|---|---|
| 8,287,425 B2* | 10/2012 | Omote | B60K 6/387 477/3 |
| 8,834,132 B2* | 9/2014 | Kato | F01L 1/3442 123/196 R |
| 2002/0139345 A1 | 10/2002 | Takahara et al. | |
| 2004/0265138 A1 | 12/2004 | Bruhl et al. | |
| 2005/0169773 A1* | 8/2005 | Schwarz | F04C 2/086 417/310 |
| 2013/0274047 A1* | 10/2013 | Gotz | B60K 6/383 475/5 |
| 2016/0207401 A1 | 7/2016 | Kasuya et al. | |
| 2016/0230756 A1 | 8/2016 | Kito et al. | |

FOREIGN PATENT DOCUMENTS

| | | | | |
|---|---|---|---|---|
| DE | 102006030041 A1 | 1/2008 | | |
| DE | 102011084542 A1 | 4/2013 | | |
| DE | 102013213051 A1 | 12/2014 | | |
| IE | 10326887 A1 | 12/2004 | | |
| JP | S56161323 U | 12/1981 | | |
| JP | H02153281 A | 6/1990 | | |
| JP | H02114705 U | 9/1990 | | |
| JP | H04-55203 A | 2/1992 | | |
| JP | H06-25581 U | 4/1994 | | |
| JP | 2000045955 A | * | 2/2000 | |
| JP | 2000045955 A | | 2/2000 | |
| JP | 2003206858 A | | 7/2003 | |
| JP | 2014231770 A | * | 12/2014 | .............. H02K 7/14 |
| JP | 2015-086841 A | | 5/2015 | |
| WO | 2011/095148 A2 | | 8/2011 | |
| WO | 2013/053854 A1 | | 4/2013 | |
| WO | 2015/046560 A1 | | 4/2015 | |
| WO | 2015/046578 A1 | | 4/2015 | |

OTHER PUBLICATIONS

Office Action dated Jun. 6, 2016 from corresponding German Patent Application No. 10 2015 221 891.0.

* cited by examiner

CONVEYING DEVICE FOR CONVEYING OIL

CROSS-REFERENCE TO RELATED APPLICATIONS

This application claims the benefit of PCT Application PCT/EP2016/076563, filed Nov. 3, 2016, which claims priority to German Patent Application 10 2015 221 891.0, filed Nov. 6, 2015. The disclosures of the above applications are incorporated herein by reference.

FIELD OF THE INVENTION

The invention relates to a delivery device for delivering oil from an oil sump to a lubricating oil circuit of a combustion engine or a transmission of a motor vehicle, having an oil pump, a mechanical direct drive and an activatable electric drive for driving the oil pump.

BACKGROUND OF THE INVENTION

A delivery device having an activatable electric drive is known, for example, from DE 10 2011 084 542 A1. The direct drive generates a delivery volume at a delivery pressure in accordance with the speed of the combustion engine. When there is an increased requirement, the power of the oil pump can be increased by activating the electric drive.

However, there is the problem with modern motor vehicles, especially in the case of dual clutch transmissions, that a relatively high oil pressure is necessary to actuate and hold the clutch, and a relatively low pressure with a high delivery volume is required to cool the clutch. Moreover, the demand for oil to cool the clutch is not proportionate to the speed of the combustion engine. Therefore, designing the oil pump for the maximum delivery pressure required and the maximum delivery volume required leads to severe overdimensioning.

SUMMARY OF THE INVENTION

The problem underlying the invention is to develop a delivery device of the type stated at the outset in such a way that it allows the generation of two different delivery pressures at envisaged delivery volumes and is of simple construction.

According to the invention, this problem is solved by virtue of the fact that the oil pump has a first pressure stage and a second pressure stage and in that the two pressure stages have a common suction connection and separate outlet connections.

By means of this configuration, the pressure stages can be designed for different delivery pressures and delivery volumes. By means of the mechanical direct drive, it is possible to ensure an envisaged oil delivery for the normal operation of the combustion engine or of the oil pump. The activatable electric drive makes it possible to cover a peak load oil demand as regards the delivery pressure and delivery volume. The delivery device is furthermore of particularly simple construction in comparison with the use of two separate oil pumps.

According to an advantageous refinement of the invention, assistance for the delivery power of the first pressure stage by the activatable electric drive can be produced in a simple manner if the first pressure stage has two components that can be moved relative to one another, and the activatable electric drive is connected to one of the components that can be moved relative to one another and the direct drive is connected to the other of the components.

In another advantageous refinement of the invention, continuous delivery of oil can be ensured in a simple manner if the second pressure stage and one of the components of the first pressure stage that can be moved relative to one another are connected continuously to the direct drive. By means of this configuration, both pressure stages are driven continuously by way of the direct drive. This enables two separate consumers to be supplied continuously at different delivery pressures. The activatable electric drive makes it possible to boost the delivery power of the first pressure stage when one of the consumers has an increased delivery volume requirement.

In another advantageous refinement of the invention, the delivery device has a particularly low energy consumption if the second pressure stage and one of the components of the first pressure stage that can be moved relative to one another are connected continuously to the activatable electric drive. In this case, driven by the direct drive, only the first pressure stage delivers a delivery volume dependent on the speed of the combustion engine at a delivery pressure determined by the first pressure stage. This delivery can be fed to a consumer in the motor vehicle for continuous operation. If an increased pressure and/or an increased volume flow is required, the electric drive is activated and drives both the second pressure stage and also the first pressure stage in addition to the direct drive. Thus, the second delivery pressure and the increased delivery volume are achieved by activating the electric drive.

In another advantageous refinement of the invention, the delivery device is of particularly simple design configuration if the first pressure stage is a vane pump having a rotor and a runner part, which can be moved relative to the rotor, and if the direct drive is connected to the rotor or the runner part, and the electric drive is connected to the other component of the runner part or of the rotor in each case. Movably arranged vanes are preferably guided positively in the rotor and are thus continuously preloaded against the runner part. The vane pump is furthermore preferably of double-stroke design, resulting in a particularly small installation space for an envisaged delivery volume.

To generate the envisaged delivery pressures and delivery volumes, the individual pump stages are preferably designed as different pump types. In another advantageous refinement of the invention, a rapid start of delivery of the oil when the combustion engine is started can be ensured in a simple manner if the second pressure stage is a vane pump, an internal gear pump or an external gear pump.

In another advantageous refinement of the invention, the delivery device requires a particularly small number of components to be installed if the first pressure stage and the second pressure stage are arranged in a common housing. Moreover, this makes the delivery device of particularly compact configuration.

In another advantageous refinement of the invention, a contribution to further reducing the dimensions of the delivery device is made if a drive shaft of the electric drive is designed at least in part as a hollow shaft and is arranged concentrically with a shaft of the direct drive. Another advantage of this configuration is that the hollow shaft can be provided with a small outside diameter, significantly simplifying the sealing of the hollow shaft relative to the housing.

In another advantageous refinement of the invention, permanent energization of the activatable electric drive can be easily avoided if the activatable electric drive has a freewheel or a selectable brake for supporting the torque generated by the direct drive.

In another advantageous refinement of the invention, the delivery power of the first pressure stage of the oil pump is freely controllable in a particularly broad range if the control device has a generator mode for the activatable electric drive for the purpose of reducing the power of the oil pump. By means of this configuration, the electric drive is designed to transmit a braking load to the oil pump in the generator mode. If the braking load is low, the direct drive will, by means of the first of the components that are movable relative to one another, jointly rotate the second component, which is connected to the electric drive, leading to a reduction in the delivery power of the oil pump. If the braking load is high, the second component, which is connected to the electric drive, will be to a large extent immobilized, and the oil delivery will be correspondingly high in accordance with the power of the mechanical direct drive. Owing to the invention, the second component, which is connected to the activatable electric drive, of the first pressure stage can be moved selectively in one or the other direction, in accordance with the control by the control device. The activatable electric drive can thus be used, in the case of high rotational speeds of the mechanical direct drive, for the purpose of reducing the power of the first pressure stage.

In another advantageous refinement of the invention, a particularly advantageous use of the delivery device in a motor vehicle is obtained if the one pressure stage is designed to generate 2 to 3 bar and the other pressure stage is designed to generate 5 to 30 bar. By virtue of this configuration, the delivery device can be used in transmissions for the purpose of cooling and controlling a clutch or selector dogs and can be used in the combustion engine to deliver a lubricating oil and to adjust a camshaft. A clutch requires 30 bar at 3 l/min for actuation and 30 l/min at 2-3 bar for cooling, for example. By way of example, a combustion engine requires 5 bar at a relatively low delivery volume to adjust a camshaft and approximately 2 bar at a higher delivery volume to maintain lubricating oil circulation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention permits numerous embodiments. To further illustrate its basic principle, one of these embodiments is illustrated in the drawing and will be described below. In the drawing.

DETAILED DESCRIPTION OF THE PREFERRED EMBODIMENT

The following description of the preferred embodiment(s) is merely exemplary in nature and is in no way intended to limit the invention, its application, or uses.

Figure 1:
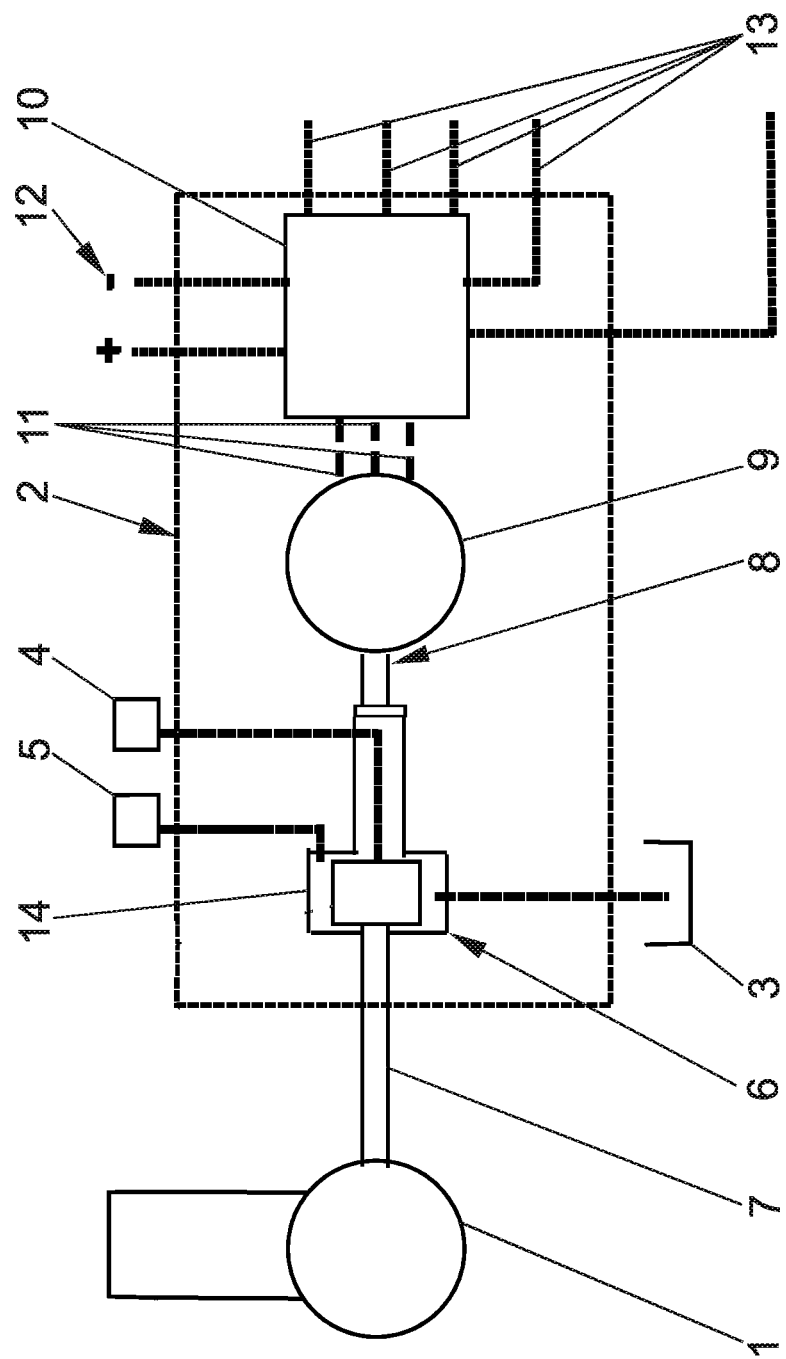
FIG. 1 schematically shows a combustion engine of a motor vehicle having a delivery device.

FIG. 1 schematically shows a combustion engine 1 of a motor vehicle having a delivery device 2 for delivering oil from an oil sump 3 to two consumers 4, 5. The consumers 4, 5 can be a lubricating oil circuit with a camshaft adjustment system of the combustion engine 1 or a hydraulically shiftable transmission that can be cooled by means of the oil or a clutch that can be shifted and cooled. In the case of such consumers 4, 5, a high oil pressure at a low delivery volume is required for shifting or actuation and a low oil pressure at a high delivery volume is required for lubrication or cooling. The delivery device 2 has an oil pump 6 with a direct drive 7 by means of the combustion engine 1 and an activatable electric drive 8. An electric motor 9 of the activatable electric drive 8 is connected to an electronic control device 10 which actuates the electric drive 8 via control lines 11, and which supplies electrical current from an on-board electrical system 12 of the motor vehicle, in a manner dependent on input signals such as a motor rotational speed, the demanded motor torque, the oil temperature and a setpoint pressure. For the supply of the input signals, the control device 9 is connected to signal lines 13.

Figure 2:
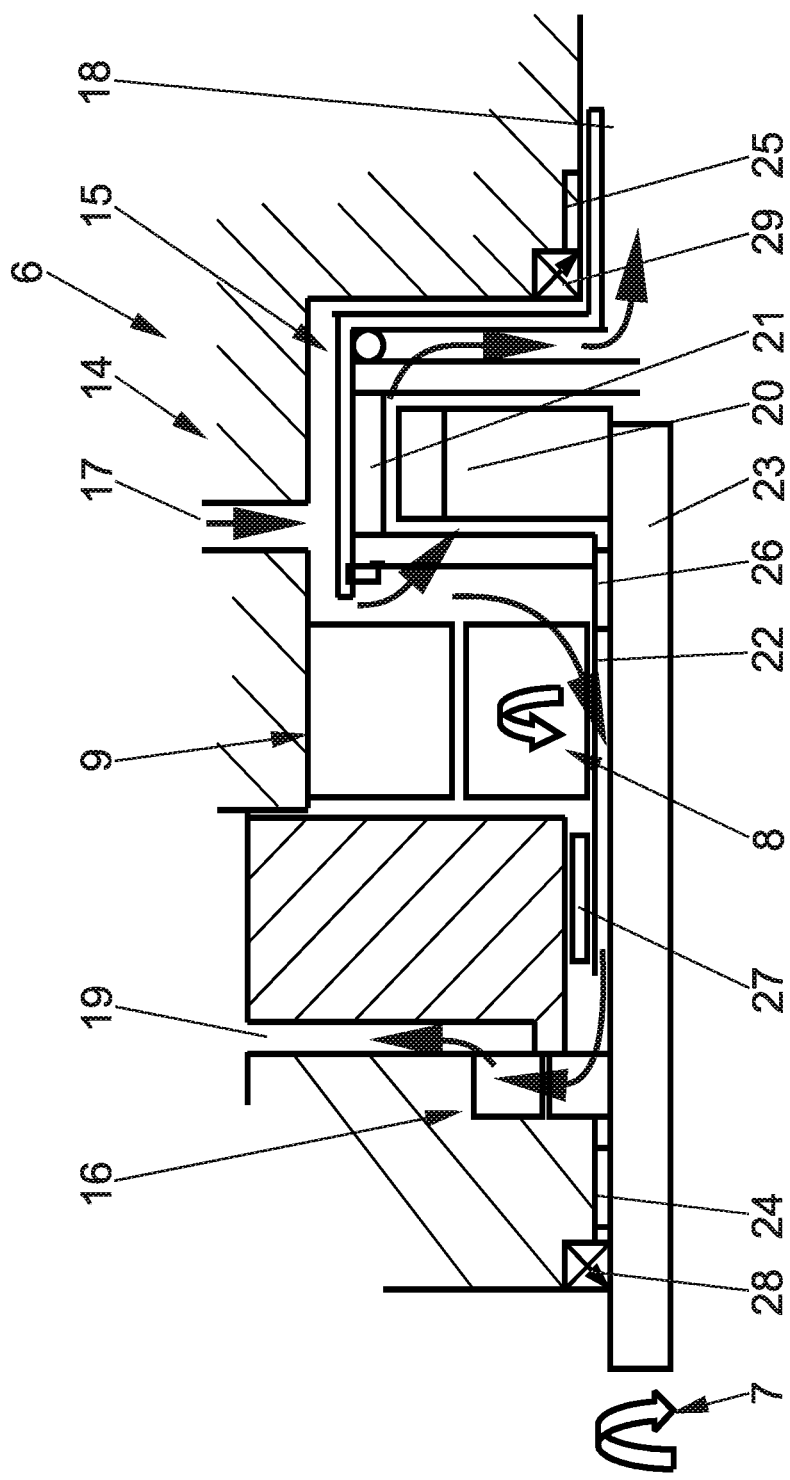
FIG. 2 schematically shows an oil pump delivery device from FIG. 1.

FIG. 2 schematically shows the oil pump 6 of the delivery device 2 from FIG. 1. The oil pump 6 has a common housing 14 for two pressure stages 15, 16. The pressure stages 15, 16 are connected to a common suction connection 17 and each have an outlet connection 18, 19. The suction connection 17 is connected to the oil sump 3. The outlet connections 18, 19 each lead to the consumers 4, 5 shown in FIG. 1. A first pressure stage 15 has a rotor 20 and a runner part 21 of a vane pump, the runner part surrounding the rotor 20. Thus, the oil pump 6 has two components that may be moved relative to one another for delivering the oil, of which one is connected to the direct drive 7 and the other is connected to the activatable electric drive 8. The second pressure stage 16 is designed as a positive displacement pump and is connected exclusively to the direct drive 7. Thus, the second pressure stage 16 delivers oil in accordance with the speed of the direct drive 7 and hence of the combustion engine 1. The first pressure stage 15 also delivers oil in accordance with the speed of the direct drive 7. As the demand increases, the electric drive 8 is activated and makes it possible to boost the delivery of oil. The delivery pressure and the delivery volume of the first pressure stage 15 is thus boosted by activating the electric drive 8.

The electric motor 9 of the activatable electric drive 8 drives a hollow shaft 22. The hollow shaft 22 surrounds a shaft 23 of the direct drive 7. Bearings 24-26 support the hollow shaft 22 and the shaft 23 on the ends of the housing 14 and relative to one another. Sealing rings 28, 29 which seal off the shaft 23 and the hollow shaft 22 relative to the housing 14 are furthermore provided. Thus, the oil flows via the central suction connection 17 to the two pressure stages 15, 16 and then to the two outlet connections 18, 19. For the sake of clarity, the flows of the oil are indicated by arrows.

The electric drive 8 has a freewheel 27 to support the torque transmitted by the direct drive 7 via the first pressure stage 15 in the deenergized state of the electric motor 9. Instead of the freewheel 27, it is also possible to use a selectable brake to support the torque transmitted by the direct drive.

In another embodiment, it is also possible for the freewheel 27 or the selectable brake to be omitted if the electric motor 9 is switched to support the torque of the direct drive 7 by appropriate energization. Furthermore, the control device 10 illustrated in FIG. 1 may have a generator mode for the activatable electric drive 8 for the purpose of reducing the power of the oil pump 6 which is generated by the direct drive 7. Thus, the engine torque introduced by the direct drive 7 can be fully or partially supported.

Figure 3:
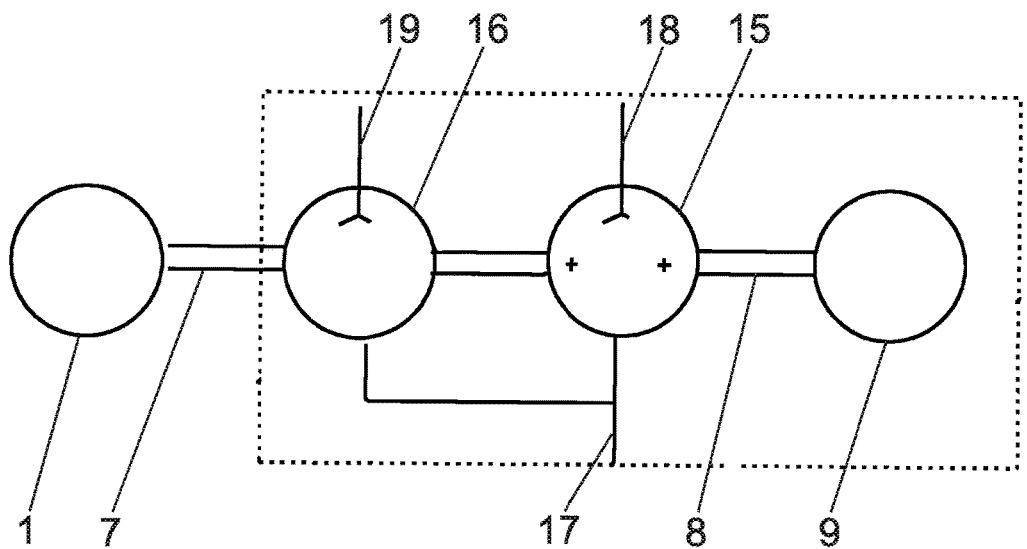
FIG. 3 schematically shows an interconnection of the delivery device with the combustion engine and an activatable electric drive.

FIG. 3 schematically shows the interconnection of the two pressure stages 15, 16 and of the connections of the oil pump 6 from FIG. 2. The "+" sign in the first pressure stage 15 indicates that the driving powers of the direct drive 7 and of the activatable electric drive 8 are added to one another. The second pressure stage 16 is constantly connected to the direct drive 7 and therefore delivers oil continuously during the operation of the combustion engine 1.

Figure 4:
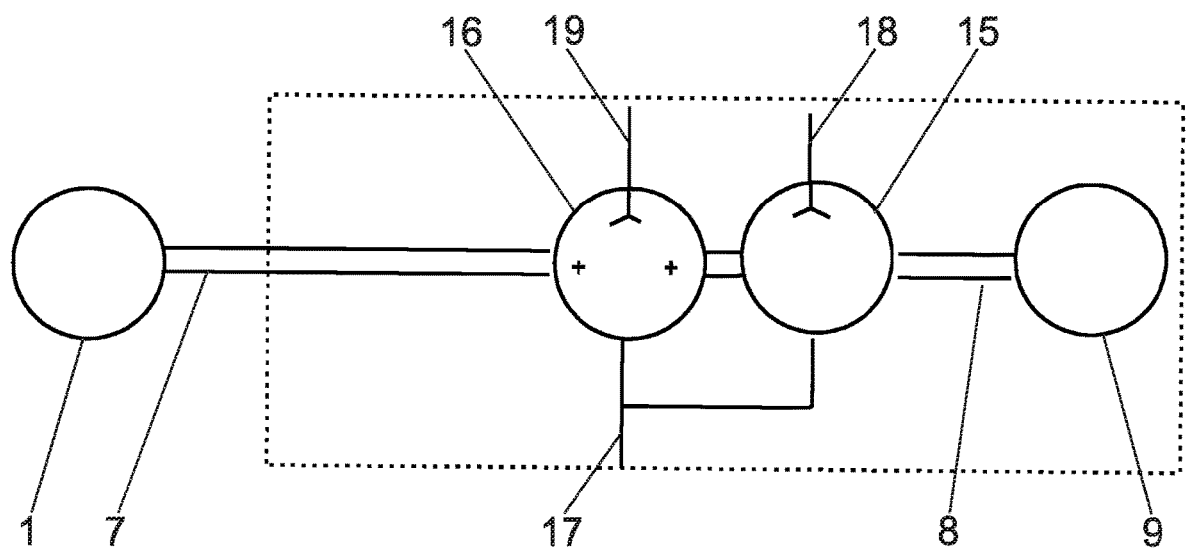
FIG. 4 schematically shows another embodiment of the interconnection of the delivery device.

FIG. 4 shows another embodiment of an interconnection of the pressure stages 15, 16, which differs from that in FIG. 3 in that the second pressure stage 16 can only be driven by the electric drive 8. When the electric drive 8 is stationary, therefore, there is no delivery of oil via the second pressure stage 16. As with the interconnection shown in FIG. 3, the first pressure stage 15 can be driven both by the direct drive 7 and the electric drive 8.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A delivery device for delivering oil from an oil sump to a lubricating oil circuit of a combustion engine or a transmission of a motor vehicle, comprising:
    a mechanical direct drive;
    an activatable electric drive;
    an oil pump having a first pressure stage and a second pressure stage, the oil pump operable for being driven by either the mechanical direct drive or the activatable electric drive;
    a first outlet connection being part of the first pressure stage;
    a second outlet connection being part of the second pressure stage;
    a common suction section, the first pressure stage being in fluid communication with the common suction section, and the second pressure stage being in fluid communication with the common suction section, such that a portion of the oil flows from the common suction section, through the activatable electric drive to the second pressure stage;
    a common housing, and the first pressure stage, the second pressure stage, and the activatable electric drive are arranged in the common housing such that the activatable electric drive is located between the first pressure stage and the second pressure stage;
    the first pressure stage further comprising:
        two components that are movable relative to one another, and the activatable electric drive is connected to one of the two components that is movable relative to one another, and the direct drive is connected to the other of the two components that are movable relative to one another;
        wherein the second pressure stage and one of the two components of the first pressure stage that are movable relative to one another are connected continuously to the direct drive.

2. The delivery device of claim 1, wherein the second pressure stage and one of the two components of the first pressure stage that are movable relative to one another are connected continuously to the activatable electric drive.

3. The delivery device of claim 1, the first pressure stage further comprising:
    a vane pump comprising:
        a rotor; and
        a runner part, which is movable relative to the rotor;
    wherein the direct drive is connected to one of the rotor or the runner part, and the electric drive is connected to the other component of the runner part or the rotor.

4. The delivery device of claim 1, the second pressure stage being one selected from the group consisting of a vane pump, an internal gear pump, and an external gear pump.

5. The delivery device of claim 1, wherein the first pressure stage and the second pressure stage are arranged in the common housing.

6. The delivery device of claim 1, wherein a drive shaft of the electric drive is, at least in part, a hollow shaft and is arranged concentrically with a shaft of the direct drive.

7. The delivery device of claim 1, the activatable electric drive further comprising a freewheel for supporting the torque generated by the direct drive.

8. The delivery device of claim 1, the activatable electric drive further comprising a selectable brake for supporting the torque generated by the direct drive.

9. The delivery device of claim 1, further comprising a control device comprising a generator mode for the activatable electric drive for the purpose of reducing the power of the oil pump.

10. The delivery device of claim 1, wherein at least one of the first pressure stage or the second pressure stage is designed to generate 2 to 3 bar, and the other of the first pressure stage or the second pressure stage is designed to generate 5 to 30 bar.

* * * * *